United States Patent [19]

Van Rooij et al.

[11] Patent Number: 4,986,798
[45] Date of Patent: Jan. 22, 1991

[54] TRANSMISSION CHAIN WITH PIVOT PINS AND INTERMEDIATE PIECES WITH ROLLING CONTACT ACTION

[75] Inventors: Jacobus H. M. Van Rooij, Nuenen; Theodorus P. M. Cadee, Asten, both of Netherlands

[73] Assignee: Volvo Car B.V., Helmond, Netherlands

[21] Appl. No.: 417,518

[22] Filed: Oct. 5, 1989

[30] Foreign Application Priority Data

Oct. 7, 1988 [NL] Netherlands ................. 8802467

[51] Int. Cl.$^5$ .............................................. F16G 13/06
[52] U.S. Cl. .................................. 474/214; 474/216
[58] Field of Search ............... 474/91, 206, 210, 212, 474/213–217, 219, 231, 240, 242, 246, 207

[56] References Cited

U.S. PATENT DOCUMENTS

| | | | |
|---|---|---|---|
| 1,624,058 | 4/1927 | Morse | 474/216 X |
| 2,660,898 | 12/1953 | Kew | 474/91 X |
| 4,729,756 | 3/1988 | Zimmer | 474/214 |

FOREIGN PATENT DOCUMENTS

| | | |
|---|---|---|
| 0060008 | 9/1982 | European Pat. Off. |
| 0102673 | 3/1984 | European Pat. Off. |
| 2356289 | 11/1974 | Fed. Rep. of Germany |
| 417982 | 10/1934 | United Kingdom |

*Primary Examiner*—Thuy M. Bui

[57] ABSTRACT

Transmission chain for a cone pulley drive with intercoupled links and pivot pins inserted through link openings, the end surfaces of which cooperate with the cone surfaces, and where between each pivot pin, on the one hand, and the opposite-lying upright opening sides of a number of adjacent links, on the other, an intermediate piece with rolling contact action is inserted whose first longitudinal side is coupled to the link opening side and of which the opposite-lying second longitudinal surface forms the rolling contact surface cooperates with the longitudinal side of the pin, a number of grooves running between the first and the second longitudinal side being formed in each intermediate piece in at least the narrow longitudinal side facing the inside of the chain.

6 Claims, 3 Drawing Sheets

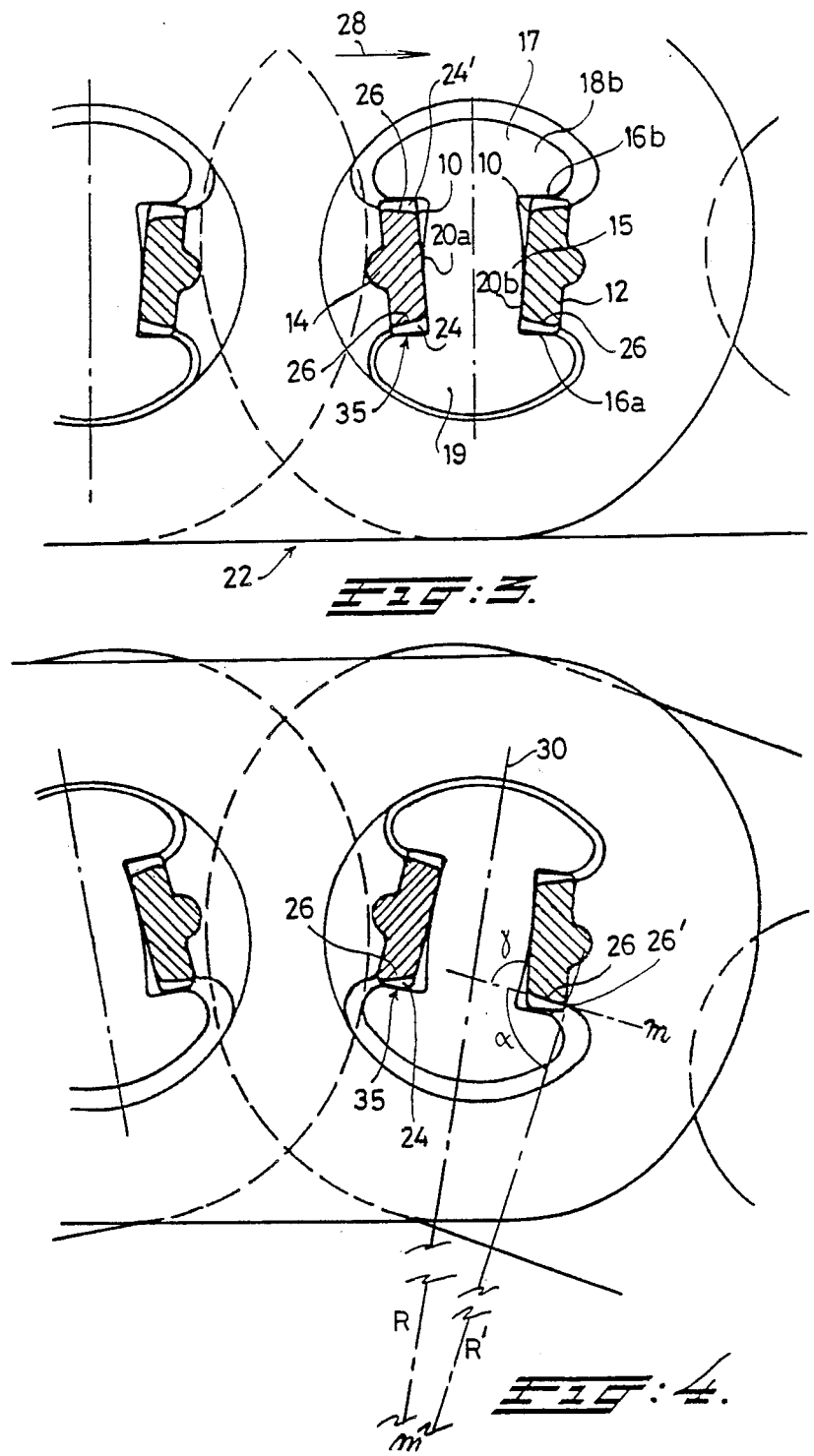

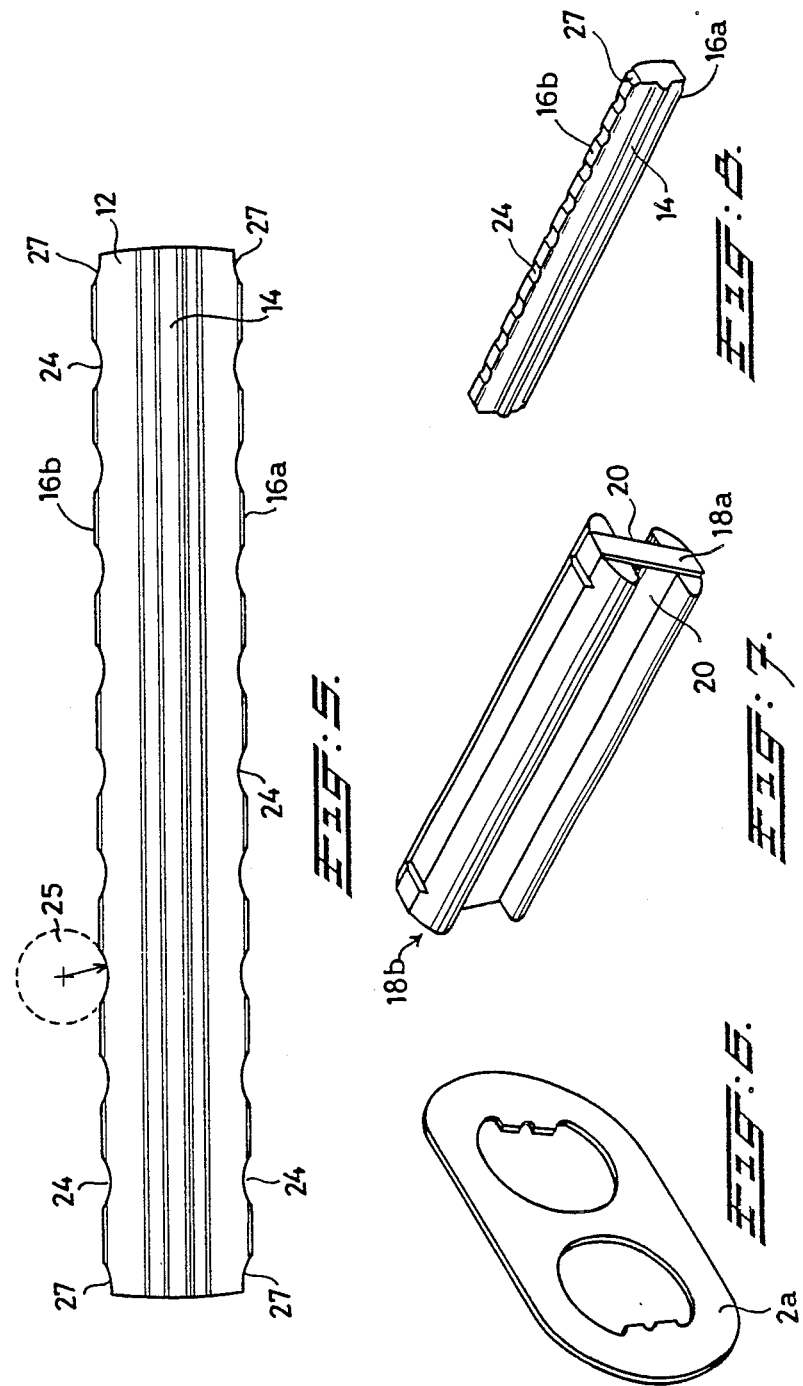

TRANSMISSION CHAIN WITH PIVOT PINS AND INTERMEDIATE PIECES WITH ROLLING CONTACT ACTION

BACKGROUND OF THE INVENTION

Transmission chain for a cone pulley drive, comprising a number of intercoupled links each accommodating two pivot pins which lie at right angles to the link plane and are inserted through link openings, and the end surfaces of which cooperate as friction faces with the cone surfaces, and whose longitudinal sides constitute rolling surfaces with a radius of curvature different from that of the rolling surface cooperating therewith, and where between each pivot pin, on the one hand, and the opposite-lying upright opening sides of a number of adjacent links, on the other, an intermediate piece with rolling contact action is inserted whose first longitudinal side is coupled to the link opening side, and of which the oppposite-lying second longitudinal surface forms the rolling contact surface cooperating with the longitudinal side of the pin.

DESCRIPTION OF THE PRIOR ART

Such a chain is known from the European Patent Application Nos. 0 060 008 and 0 102 673.

In such a transmission chain (which is in particular intended for use in a continuously variable transmission) premature wear of the cooperating longitudinal sides of intermediate piece and pivot pin respectively sometimes occurs, the cause of which must be attributed to inadequate local lubrication. The result of such wear is premature extension of the chain, which means that the transmission can no longer function properly. An obvious solution to this problem would be to run the chain through an oil bath. However, in view of the high running speeds (up to 50 m/s) which are used, this produces considerable energy losses. Another solution is achieved by providing the lubrication by spraying pressurized oil from inside of the transmission chain against the passing chain parts; in the curved chain track parts oil carried along is worked to the outside by the centrifugal force, and the oil must find its way between the pivot pins and the intermediate pieces. However, in practice, this lubricating action is not always found to be adequate in particular at high speeds.

The object of the invention is to provide a solution to this problem. This object is achieved according to the invention in that a number of grooves running between the first and the second longitudinal side is provided in each intermediate piece in at least the narrow longitudinal side facing the inside of the chain.

It has been found in practice that with the measures according to the invention excellent lubrication of the cooperating surfaces of pivot pins, on the one hand, and intermediate pieces, on the other, is achieved, so that with a measure which hardly increases the manufacturing costs of the chain (the grooves can be formed in the pins in a simple manner by cold deformation) the service life of the transmission chain is considerably extended.

Preferably the grooves widen in the direction of the second longitudinal side, while they are preferably at right angles to the two longitudinal sides.

In a preferred embodiment is, in the position in which the chain assumes a radius of curvature, the angle formed between the rolling face of the intermediate piece and a plane touching the groove bottom is less than 90°. The angle of flare of the grooves is preferably greater than 2°, while the groove bottom has a circular cross-section.

The number of grooves is preferably equal to the number of links cooperating with the particular intermediate piece. When the grooves are disposed in both narrow transverse sides, while each intermediate piece end has two diverging transitions to the respective narrow longitudinal sides, each formed by a part of a groove, the assembly of the transmission chain is made considerably easier. During assembly, after the fitting of the links round the pivot pins, the intermediate pieces are inserted between pivot pins and links and the rounded parts present in the preferred embodiment thereby serve as a "locating edge" by means of which the assembly is speeded up considerably. In particular, when the grooves are formed by cold deformation, it is possible through trimming through the center of an oil groove of a length of suitably shaped material provided with a series of grooves to obtain in a simple manner intermediate pieces having this configuration.

DESCRIPTION OF THE DRAWINGS

FIG. 3 is a part of FIG. 1 on a considerably larger scale;

FIG. 4 is a part of FIG. 2 on a considerably larger scale;

FIG. 5 is a side view of an intermediate piece according to the invention;

FIG. 6 is a perspective view of a link used in a transmission chain according to the invention;

FIG. 7 is a perspective view of a pivot pin used in such a transmission chain;

FIG. 8 is a perspective view of an intermediate piece used in such a transmission chain.

DESCRIPTION OF PREFERRED EMBODIMENTS

In a transmission chain of the type to which the invention relates, such as described in the European Patent Application Nos. 0 060 008 and 0 102 673 (which are included herein by reference), one link always cooperate with two pins, and each side face of each pin always cooperates with a rolling face of an intermediate piece which is disposed between the pin in question and a supporting surface situated in the link opening; when they run between the cone pulleys the pins are clamped between them and carried along. In such a transmission chain the torque is transmitted by the difference between the tensile forces in the two stretched chain parts.

Figure 1:
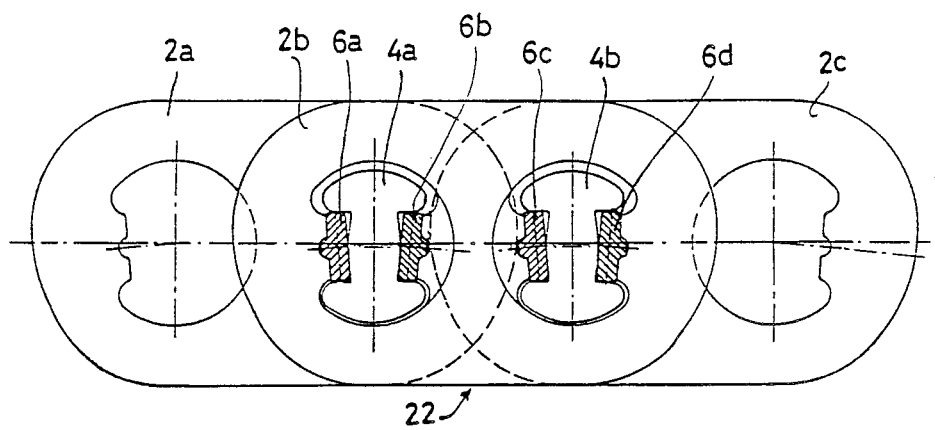
FIG. 1 is an end view of three transmission chain links with their pivot pins and intermediate pieces shown in the position which these parts take up in the right-hand part of the transmission chain.

FIG. 1 shows in end view a part of three links 2a–2c, and the pivot pins 4a–4b. The pin 4a cooperates with the links 2a, 2b, and the pin 4b with the links 2b, 2c. Each pin 4a, 4b cooperates with the appropriate links by means of two intermediate piece with rolling contact action, for the pin 4a the pieces 6a, 6b, and for the pin 4b the pieces 6c, 6d. A number of links lying in the transverse direction of the chain rest on each intermediate piece, as known per se. The intermediate piece has a flat longitudinal side 10 which forms the rolling surface with the pivot pin (see FIG. 3); the other longitudinal side 12 bears along part of its length a projecting rib 14 which fits into a groove in the link. The intermediate piece is fixed by this rib relative to the link. There are also two narrow longitudinal sides 16a, 16b.

Each pivot pin has two end faces 18a, 18b (FIG. 7). These end faces cooperate with the cone pulleys, as known per se. The transverse section of the pins is also characterized by the central body 15, the widened top part 17, and the widened bottom part 19 (FIGS. 3 and 4). The intermediate pieces are disposed between these widened parts of the pin section (as known per se). This configuration is also known per se.

It is, of course, of crucial importance for a long service life of such a transmission chain that there should be excellent lubrication between the longitudinal faces 20a, 20b of the longitudinal recessed portions 20 of the pivot pins and the longitudinal faces of the intermediate pieces, thus the faces 10, cooperating therewith. For this, oil is sprayed under pressure through a suitable nozzle against the inside of the chain, e.g. in the direction of the arrow 22 in FIG. 1; the oil carried along is flung out by the centrifugal force in the curved track part of the chain, and during operation sufficient oil must penetrate between the intermediate pieces and the pivot pins to ensure a good lubrication. The object of the invention is to ensure this. According to the invention, to this end a series of grooves is disposed in at least the inward-facing narrow longitudinal side 16a of each intermediate piece, lying at right angles to the longitudinal axis thereof, indicated by reference numbers 24 in FIG. 5.

In order to prevent special attention having to be paid to the orientation of the intermediate pieces during the assembly of the transmission chain, both the narrow longitudinal sides 16a and 16b will preferably be provided with such grooves, as FIG. 5 shows.

Figure 2:
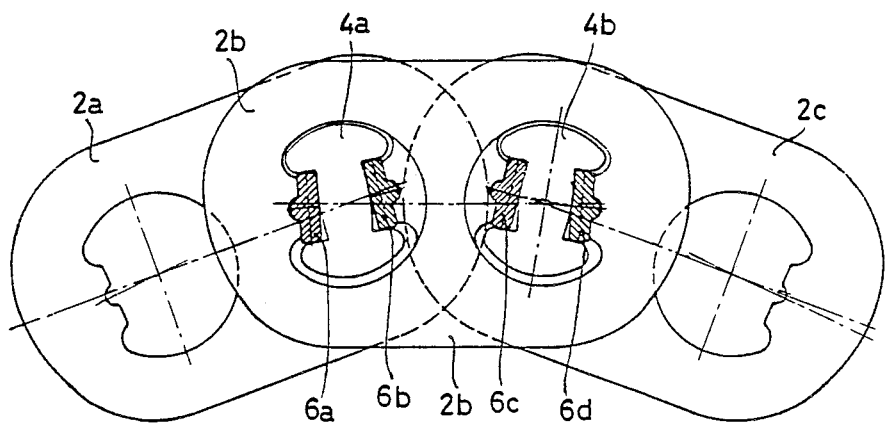
FIG. 2 is a corresponding side view of the parts in a curved part of the chain, at a part curved to a certain radius of curvature.

These grooves are designed in such a way that, as shown in particular by the detail cross-sections in FIGS. 3 and 4, they widen out from the longitudinal side 12 to the longitudinal side 10, while the groove bottom in the preferred embodiment shown has a circular limitation without sharp transitions. The way in which these grooves work follows from a comparison of FIGS. 3 and 4. FIG. 3 shows the position of the intermediate pieces relative to the pins in the right-hand part of the transmission chain, which is assumed to move in the direction of the arrow 28. Oil which is sprayed, for example, in the direction of the arrow 22 against the chain penetrates into the space between the groove bottom 26 of the groove 24 and the face 35 of the widened part 19 of the pin and fills the groove 24. On running into the curved part, i.e. on reaching the position shown in FIG. 4, the position of the intermediate pieces relative to the pivot pins changes in such a way that the situation shown in FIG. 2 is reached, shown on an enlarged scale in FIG. 4: it can be seen that the oil caught in the groove 24 can move into the free space between intermediate pieces and pin longitudinal side under the influence of the centrifugal force. A good lubrication is thus ensured.

Good functioning is ensured if in the right-hand part of the chain the narrow ends of the grooves are open—see FIG. 3—and in the curved state (in which the, chain links assume a radius of curvature R indicated at 30)—see FIG. 4—the angle α formed between a line R', running from the center of curvature M to the outermost point 26' of the lubrication groove bottom and a plane indicated by m touching the groove bottom 26 is at least 90°. This also means that in a curved part of the chain the angle γ included between the rolling face of the intermediate piece and a plane touching the groove bottom is less than 90°. In the usual chain construction this means, assuming the largest radius of curvature which the chain can take up on the pulley, that the angle of flare of the groove 24 is greater than 2°.

The figures show an embodiment in which nine grooves of the above-mentioned type are disposed along the narrow longitudinal sides, the groove bottom of each of which has a circular cross-section, as indicated by the circle 25 shown by the dashed and dotted line. Of course, this number is not restrictive: the number of grooves can be determined for each transmission chain and each transmission chain situated on the basis of experience already gained with such transmissions. In the case of a heavily loaded transmission chain operating at high running speeds more grooves will, of course, be used than in the case of a chain with only a low load and running slowly.

If the grooves are provided (e.g. by cold deformation) with such spacing between them that each end face of an intermediate piece divides an oil groove through the middle and the intermediate pieces are formed by trimming a suitable shaped preformed piece of material, two "locating edges" 27 are obtained without additional working on each of the ends, and these facilitate the insertion of the intermediate pieces during assembly of the chain.

What is claimed is:

1. Transmission chain for a cone pulley drive, comprising a number of intercoupled links each accommodating two pivot pins which lie at right angles to the link plane and are inserted through link openings, and the end surfaces of which cooperate as friction faces with the cone surfaces, and whose longitudinal sides constitute rolling surfaces with a radius of curvature different from that of the rolling surface cooperating therewith, and where between each pivot pin, on the one hand, and the opposite-lying upright opening sides of a number of adjacent links, on the other, an intermediate piece with rolling contact action is inserted whose first longitudinal side is coupled to the link opening side, and of which the opposite-lying second longitudinal surface forms the rolling contact surface cooperating with the longitudinal side of the pin, a number of grooves running between the first and the second longitudinal side being provided in each intermediate piece in at least the narrow longitudinal side facing the inside of the chain, said grooves widen in the direction of the second longitudinal side.

2. Transmission chain according to claim 1 characterized in that in the position in which the chain assumes a radius of curvature the angle formed between a rolling face of the intermediate piece and a plane touching the groove 30 bottom is less than 90°.

3. Transmission chain according to claim 1, characterized in that said grooves have an angle of flare greater than 2°.

4. Transmission chain according to claim 1 characterized in that the number of grooves is equal to the number of links cooperating with the particular intermediate piece.

5. Transmission chain according to claim 1 characterized in that the grooves are disposed in both narrow transverse sides.

6. Transmission chain according to claim 5, characterized in that each intermediate piece end has two diverging transitions to the respective narrow longitudinal sides, each formed by a part of a groove.

* * * * *